United States Patent Office 3,751,457
Patented Aug. 7, 1973

3,751,457
DISPROPORTIONATION OF ALKALI METAL SALTS
OF AROMATIC CARBOXYLIC ACIDS
Stanley J. Marwil, Bartlesville, Okla., assignor to
Phillips Petroleum Company
No Drawing. Filed Jan. 31, 1972, Ser. No. 222,279
Int. Cl. C07c 63/26
U.S. Cl. 260—515 P          7 Claims

ABSTRACT OF THE DISCLOSURE

A slurry comprised of an alkali metal salt of an aromatic carboxylic acid, e.g. potassium benzoate, a disproportionation catalyst, e.g. zinc benzoate, and an inert high-boiling organic dispersant, e.g. a terphenyl, and activated carbon dispersed in the organic dispersant together with said salt and catalyst, are subjected to an elevated temperature in the presence of a gas atmosphere, e.g. carbon dioxide to form a polycarboxylate having at least one more carboxyl group than said salt.

---

This invention relates to the production of aromatic carboxylic acids from aromatic polycarboxylates. It also relates to the production of aromatic polycarboxylates by disproportionation of alkali metal salts of aromatic carboxylic acids.

In one concept the invention provides for the disproportionation of an alkali metal salt of a carboxylic acid in an organic dispersant in liquid phase also containing an activated charcoal. In another of its concepts the invention provides for said disproportionation in the presence of a catalyst aided by said activated charcoal.

It is known that an alkali metal salt of a carboxylic acid having a carboxyl group attached to an aromtic ring system can be converted, i.e., transformed, into a salt of a different carboxylic acid having at least two carboxyl groups in the molecule by subjecting the alkali metal salt to an elevated temperature in the presence of a protective gas. This transformation is a solid state reaction, that is, the alkali metal salt is heated in the solid state to produce the transformation, called disproportionation. The product is also in the solid state. This solid state reaction poses considerable difficulties in commercial operation, including low heat transfer in the reactor and difficulty in the transporting and in the mixing of the reactants and recovery of the reaction product. In addition, during the solid state reaction small solids fuse together to form larger solids, herein referred to as "clinkers," which are extremely difficult, if not impossible, to handle. These clinkers foul the reactor causing process interruptions, and problems in separation and recovery of the product.

It is also known, as described in Pat. 3,093,683, of June 11, 1963, in the production of aromatic dicarboxylic and polycarboxylic acids by heating alkali metal salts of aromatic carboxylic acids having three or more carboxyl groups in the molecule with alkali metal salts of aromatic monocarboxylic and dicarboxylic acids to temperatures above 300° C. and below the temperature at which substantial decomposition of the starting materials and reaction products takes place and thereafter converting the alkali metal salts so obtained into the corresponding free acids or various salts of such acids, the reaction mixture containing such salts, e.g. potassium benzoate and tripotassium salt of hemimellitic acid, to add to the reaction mixture an inert liquid or a solid additive. Among the solid additives mentioned in the patent are sand, metal powders, metal shavings, kieselguhr, activated charcoal and certain inert salts such as potassium carbonate, etc. The patent states that in place of such inert solids, inert liquids may also be present during the rearrangement reaction.

In Ser. No. 156,984, filed June 25, 1971, by Yu-Lin Wu and Paul S. Hudson, there is described and claimed in a disproportion process for the conversion of an alkali metal salt of an aromatic carboxylic acid to an aromatic polycarboxylate containing at least one additional carboxyl group comprising heating said alkali metal salt in a gas atmosphere in the presence of a disproportionation catalyst, which comprises dispersing said alkali metal salt and said catalyst in an organic dispersant to form a slurry and thereafter proceeding with said heating and wherein said organic dispersant is an aromatic hydrocarbon selected from the group consisting of polyaromatic compounds having three or more aromatic rings, polynuclear aromatics, and mixtures thereof.

I have discovered that the conversion of an alkali metal salt of an aromatic carboxylic acid to an aromatic polycarboxylate conducted in a slurry system as described in Ser. No. 156,984, can be considerably increased as can the selectivity to dipotassium terephthalate and yield if in addition to the liquid dispersant there is additionally employed activated charcoal. That is, I have discovered that the presence of the charcoal also dispersed in the organic dispersant will permit materially to increase conversion, selectivity and yield. More precisely, in accordance with this invention the solid reactants, catalyst, and activated charcoal, preferably, in finely divided form, are dispersed in an inert organic dispersant to form a slurry which is thereafter subjected to the known disproportionation conditions. The slurry of the solid reactants and of the activated charcoal in the organic dispersant thus provides the advantages set out herein. The produced solid product is not only not in a fused form and is instead carried as finely divided particles in the organic dispersant from which the product can be conveniently removed, but also the advantages of increased conversion, selectivity and yield result.

It is an object of this invention to provide an improved process for the catalytic disproportionation of a carboxylic acid salt.

Another object of this invention is to provide a process wherein the catalytic disproportionation of a carboxylic acid salt is conducted in an improved environment in a fluid medium.

Other aspects, objects and the several advantages of this invention will be apparent to one skilled in the art from this disclosure and the appended claims.

According to the invention, there is provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst, an inert high-boiling organic dispersant and activated charcoal is subjected to an elevated temperature in the presence of a gas atmosphere to thus form the desired polycarboxylate product.

The organic dispersant useful herein is one which will not decompose under the conditions of the process, which is inert to the reactants, and which is relatively high boiling. Such organic dispersants include aromatic hydrocarbons selected from the group consisting of polyaromatic compounds having three or more aromatic rings, polynuclear aromatics and mixtures thereof. Examples of such organic dispersants include polymers of benzene having repeating benzene units, e.g. terphenyls, quaterphenyls, pentaphenyls and heavier polyphenyls; binaphthyls; naphthalene, anthracene, phenanthrene, pyrene, triphenylene, chrysene, perylene, pentacenyl and mixtures thereof.

It is desirable that the organic dispersant remain in the liquid state throughout the process; thus the compound should have a melting point below about 150° C. Mixtures of two or more of the compounds can be utilized to reduce the melting point of the dispersant. It is also desirable that the dispersant have a relatively high boiling point, for example, above about 250° C., in order to aid in maintaining the reaction pressure at a low level.

The organic dispersant is present in the slurry in an amount in the range of from 25 to 80 percent by weight of the total weight of the slurry and preferably in an amount in the range of from 60 to 75 percent by weight of the total weight of the slurry.

The activated charcoal or carbon usually is present in the reaction mixture in a minor amount sufficient to yield an appreciable increase in conversion and/or selectivity or yield. An amount in the range of from about 0.5–10 percent of the reaction mixture, excluding the organic dispersant, will usually yield a desired. Now preferred is an amount in the approximate range of 1 percent to about 5 percent. Good results have been obtained with about 2.5 percent activated charcoal in the reaction mixture.

The slurry is formed by mixing the organic dispersant with the alkali metal salt of the aromatic carboxylic acid desired to be transformed, either together with the activated charcoal, before the charcoal is added to the dispersant, or thereafter. Also, it is a preferred operation to triturate or to otherwise mix together the salt or salts and the charcoal with or without presence of at least a portion of the catalyst and to then add the solids admixture to the dispersant. Any conventional method of mixing a solid or solids with a liquid can be used to form the slurry. For example, if a batch reactor is employed, the dispersant, in liquid form, is added to the reactor, and then the solid salt to be converted, such as potassium benzoate, and a suitable disproportionation catalyst, such as zinc benzoate, and the activated charcoal all preferably in finely divided form, are added to the reactor while the liquid is being stirred. If a continuous reactor is employed, the solids are metered into a separate stirred mix tank which contains the liquid dispersant wherein the slurry is formed and the slurry is then introduced into the reactor. The slurry thus obtained is then subjected to heating in a gas atmosphere to convert the alkali metal salt to the desired aromatic polycarboxylate.

In a now preferred embodiment, the alkali metal salt of the aromatic carboxylic acid is potassium benzoate, the disproportionation catalyst is zinc benzoate, and the reaction product is dipotassium terephthalate. In addition, in the preferred embodiment, the gas is carbon dioxide. Potassium cyanate, which serves as a promoter for the disproportionation reaction, can also be added but is not required.

The activated charcoal or its functional equivalent can be produced in known manner. The suitability of any specific charcoal or carbonaceous material can be determined by routine testing. The action of the activated charcoal may be due to the removal in the presence of the organic diluent or dispersant of impurities which adversely affect the catalyst or the reaction.

Starting materials for the process of this invention, in addition to the presently preferred alkali metal salts of benzoic acid are the salts of other aromatic mono- or polycarboxylic acids which have the formula

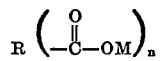

wherein R is an aromatic or alkyl aromatic group having 6 to 15 carbon atoms therein, M is an alkali metal and $n$ is the integer 1, 2 or 3. The salts are readily prepared from the corresponding acids. The acids include, for example, benzoic acid, 2-naphthalene carboxylic acid, 4-biphenylcarboxylic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4 - trimethylbenzenecarboxylic acid, 2,4,6-trimethylbenzene-1,3-dicarboxylic acid, 2-ethyl-4-hexyl 6-methyl-benzene - 1,3-dicarboxylic acid, 2,4-dibutylbenzene-1,3,5-tricarboxylic acid, and the like.

In all the above-mentioned carboxylic acid salts the aromatic ring can have alkyl radicals, in addition to the carboxylate groups, provided that these alkyl radical substituents do not bring about a decomposition of the molecule at temperatures equal to or lower than the reaction temperature.

When aromatic monocarboxylic acid salts are used as starting materials for the process according to the invention, the reaction products obtained are industrially valuable alkali metal salts of dicarboxylic acid which can be readily converted to the corresponding dicarboxylic acids, i.e. for example, dipotassium terephthalate is readily converted to terephthalic acid.

The reaction can be carried out with or without disproportionation or transformation catalysts. I have found that the reaction according to the invention in the presence of activated charcoal is favorably influenced by the presence of catalysts. Metals such as zinc, cadmium, mercury, lead, and iron, as well as compounds of these metals such as their oxides and salts formed with inorganic or organic acids and their metal organic or their complex compounds, among others, their carbonates, bicarbonates, halides, sulfates, formates, phosphates, oxalates, fatty acid salts or the salts of the above metals formed with those acids which can serve as starting materials for the reaction according to the invention or which are formed by this reaction, for example, their benzoates, phthalates or terephthalates, can be used as catalysts.

Now preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds can be used as catalysts.

The amount of catalyst used can vary within wide limits and can range from 0.1 to 100 grams of catalyst per mol of aromatic carboxylate employed, more preferably in the range of 1 to 50 grams per mol. The catalysts can be especially finely divided throughout the reaction mixture by transforming an aqueous solution of the salts serving as the starting materials, which contain the catalysts dissolved or suspended therein, into a dry powder by spray-drying or by other suitable methods. The above-named catalysts can also be used in conjunction with known carriers such as kieselguhr. The catalysts can be used as such or supported on carriers, and can be recovered from the insoluble residues of the reaction and reused in many instances without further purification.

The conversion of the alkali metal carboxylate is effected substantially completely in the absence of oxygen or water. In general, temperatures in the range of about 350 to 500° C. are employed, and more preferably in the range of 400 to 480° C.

The process of this invention can be carried out in a gas atmosphere. Examples of such gases include nitrogen, methane, argon, neon, butane, ethane, helium and the like. In one embodiment of the invention there is utilized an atmosphere which contains additionally at least 50 mol percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 p.s.i.g. to 5000 p.s.i.g. or more can be employed, but it is advantageous and preferable, in keeping with one embodiment of the instant invention, that lower pressures in the range of 0 to 1000 p.s.i.g. be employed.

Sufficient reaction time should be employed to effect the desired degree of conversion. Generally, reaction times in the range of about 1 second to about 48 hours, preferably 5 seconds to 2 hours, are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases the use of potassium cyanate offers special advantages.

The aromatic polycarboxylates which are produced according to the process of this invention can be recovered from the reaction effluent slurry by extraction with an aromatic solvent such as benzene, toluene, and the like or by an evaporation method whereby the inert organic dispersant is separated from the reaction product by evaporation or sublimation while the reaction products are hot, i.e., 300° C. to 440° C. In addition, the aromatic polycarboxylates can be recovered from the reaction effluent slurry by adding water to the slurry followed by agitation and settling. The water, being substantially completely immiscible with the organic dispersant, separates as a separate liquid phase carrying with it in solution the water-soluble aromatic polycarboxylates. The organic dispersant phase which contains the spent catalyst particles and the activated charcoal is easily removed from the water phase by conventional phase separation techniques, such as by decantation.

EXAMPLE

The results in Table I were obtained using a one-gallon autoclave. The reactants were charged to the autoclave in the amounts given, carbon dioxide continuously purged through the reaction mass at the pressures given in the table, and the reaction allowed to proceed at 825° F. for 1.5 hours. At the end of the reaction, the contents of the reactor were mixed with benzene to obtain a liquid phase (benzene containing dissolved Santowax) and a solid phase consisting of the potassium salts, catalyst, and activated carbon if used. The two phases were separated by filtration and the recovered solid phase dissolved in water at 180° F. The potassium salts dissolved in the water whereas the zinc catalyst and activated carbon did not. The solids were separated from the solution of potassium salts and the latter analyzed for potassium benzoate and dipotassium terephthalate.

The activated carbon used in the tests has Darco Grade 10X20 obtained from Atlas Chemical Industries. Particle size of the carbon was such that 95% of it passed through a No. 12 Tyler Screen and was retained on a No. 20 screen. Bulk density of the carbon was 0.39 gram per cubic centimeter. Surface area by nitrogen absorption was 700 sq. meters per gram. Total pore volume was 1.0 cc. per gram. Pore radius averaged 29 angstroms. Void space for the carbon in a packed bed was 50%.

The "Conversion" column refers to the conversion of zinc benzoate ($ZnBz_2$) and potassium benzoate (KBz) and is calculated as follows:

Percent conversion $$= \frac{\text{Moles benzoate charged} - \text{moles benzoate recovered}}{\text{Moles benzoate charged}} \times 100$$

where moles benzoate charged=moles KBz+2 (moles $ZnBz_2$).

The "Selectivity" column refers to the conversion of benzoate to dipotassium terephthalate ($K_2TP$) and this is calculated as follows:

Percent selectivity $$= \frac{2 \text{ (moles } K_2TP \text{ produced)}}{\text{Moles benzoate charged} - \text{moles benzoate recovered}} \times 100$$

The "Yield" column refers to the production of $K_2TP$ and is calculated as follows:

Percent yield=percent conversion×percent selectivity

Depending upon the amount of catalyst present, the conversion and/or selectivity may vary. As can be seen from Table I, the improvement in conversion with 10 percent catalyst was from 88.5 (Run 3) to 93.3 (Run 6) whereas with 5 percent catalyst the conversion was at best 91 (Run 10) as against 90.8 (Run 5) under the conditions of operation and other concentrations exemplified in the table. Note however that the yield for Run 7 with carbon was 81.2% compared with 76.0% for Run 5 with no carbon. Accordingly, at lower concentrations of catalyst, the use of higher concentrations of the charcoal is preferred. Presently the concentration of the activated charcoal is desired to be in the range of from about 2 percent to about 5 percent for a catalyst concentration in the range of from about 5–6 percent to about 10 percent or more. It is important to note that selectivity materially increased at 5 percent catalyst and 2.5 percent charcoal, i.e. from 83.7 percent (Run 5) and from 82.6 percent (Run 9) to 85.2 percent (Run 10) and to 90.2 percent (Run 7) respectively.

From Table I it is seen that potassium benzoate is converted to dipotassium terephthalate with higher conversions and with higher selectivity by conducting the solid state disproportionation of the potassium benzoate in a slurry system using in the named organic compounds as dispersants an activated charcoal.

TABLE I.—CONTINUOUS $CO_2$ FLOW—ZINC BENZOATE[a] CATALYST 1.5 HOURS AT 825° F., SANTOWAX[g] DISPERSANT

| Run | Pressure, p.s.i.g. | $Zn(Bz)_2$, percent | Activated carbon percent | Conv., percent | Selectivity to $K_2TP$, percent | Yield, percent | Misc. percent |
|---|---|---|---|---|---|---|---|
| 1 | 450 | 10.0 | | 84.7 | 71.5 | 60.7 | |
| 2 | 600 | 10.0 | | 85.7 | 73.8 | 63.2 | |
| 3 | 800 | 10.0 | | 88.5 | 78.3 | 69.3 | |
| 4[b] | 800 | 7.5 | | 87.8 | 80.8 | 71.0 | |
| 5[c] | 800 | 5.0 | | 90.8 | 83.7 | 76.0 | |
| 6[d] | 800 | 10.0 | 2.5 | 93.3 | 84.8 | 79.2 | |
| 7[e] | 800 | 5.0 | 2.5 | 90.0 | 90.2 | 81.2 | |
| 8[f] | 800 | 2.5 | 2.5 | 85.5 | 81.7 | 69.8 | |
| 9 | 800 | 5.0 | | 80.8 | 82.6 | 66.8 | ZnO 2.5 |
| 10 | 800 | 5.0 | 2.5 | 91.0 | 85.2 | 77.5 | (h) |
| 11 | 450 | 10.0 | | 89.2 | 74.5 | 66.5 | (h) |

NOTE.—Reactor charge for each run consisted of 410 gm. potassium benzoate (KBz), 820 gm. of Santowax, and the additional—

[a] Reactor charge included 41 gm. zinc benzoate, $Zn(Bz)_2$.
[b] Reactor charge included 30.75 gm. $Zn(Bz)_2$.
[c] Reactor charge included 20.5 gm. $Zn(Bz)_2$.
[d] Reactor charge included 10.5 gm. activated carbon.
[e] Reactor charge included 20.5 gm. $Zn(Bz)_2$ and 10.5 gm. activated carbon.
[f] Reactor charge included 10.5 gm. $Zn(Bz)_2$ and 10.5 gm. activated carbon.
[g] Santowax consists of a commercial mixture of para, meta, and ortho isomers of terphenyl obtainable from Monsanto Chemical Co.
[h] Santowax was benzene treated.

Reasonable variation and modification are possible within the scope of the foregoing disclosure and the appended claims to the invention, the essence of which is that in the disproportionation of an alkali metal salt of an aromatic carboxylic acid to an aromatic polycarboxylate in which the reaction is conducted in an organic dispersant, the use of activated charcoal in said organic dispersant during the reaction has yielded improved conversions and improved selectivities with consequent increases in yields.

I claim:

1. In a disproportionation process for the conversion of an alkali metal salt an aromatic carboxylic acid to an aromatic polycarboxylate containing at least one additional carboxyl group comprising heating said alkali metal salt in a gas atmosphere in the presence of a disproportionation catalyst, which comprises dispersing said alkali metal salt and said catalyst in an organic dispersant to form a slurry and thereafter proceeding with said heating and wherein said organic dispersant is an aromatic hydrocarbon selected from the group consisting of polyaromatic compounds having three or more aromatic rings, polynuclear aromatics, and mixtures thereof, the improvement which comprises having present in said dispersant during the reaction activated charcoal.

2. The process of claim 1 wherein said organic dispersant is present in said slurry in a liquid form in the amount of 25 to 80 percent by weight of the total weight of said slurry and the charcoal is present in the approximate range 0.5–10 percent.

3. The process of claim 2 wherein said dispersant is selected from the group consisting of $\beta,\beta$-binaphthyl, para-terphenyl, ortho - terphenyl, metaterphenyl, para - quaterphenyl and mixtures thereof.

4. The process of claim 3 wherein said alkali metal salt is potassium benzoate.

5. The process of claim 4 wherein said gas is carbon dioxide and said catalyst is zinc benzoate.

6. The process of claim 5 wherein said organic dispersant is terphenyl.

7. The process of claim 6 wherein potassium cyanate is present in said slurry.

References Cited

Sherwood Chemistry and Industry (Aug. 27, 1960), pp. 1096–1100.

JAMES A. PATTEN, Primary Examiner